United States Patent
Basson et al.

(10) Patent No.: US 7,908,060 B2
(45) Date of Patent: Mar. 15, 2011

(54) METHOD AND SYSTEM FOR BLIND SPOT IDENTIFICATION AND WARNING UTILIZING PORTABLE AND WEARABLE DEVICES

(75) Inventors: Sara H. Basson, White Plains, NY (US); Dimitri Kanevsky, Ossining, NY (US); Edward E. Kelley, Wappingers Falls, NY (US); Frances West, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 11/830,990

(22) Filed: Jul. 31, 2007

(65) Prior Publication Data
US 2009/0037104 A1   Feb. 5, 2009

(51) Int. Cl.
*G05D 3/00* (2006.01)
(52) U.S. Cl. ........ 701/45; 701/1; 701/36; 701/200; 701/213; 701/301; 340/435; 340/903
(58) Field of Classification Search .......... None
See application file for complete search history.

(56) References Cited

U.S. PATENT DOCUMENTS

| | | | |
|---|---|---|---|
| 6,115,651 | A | 9/2000 | Cruz |
| 6,198,409 | B1 | 3/2001 | Schofield et al. |
| 6,792,339 | B2 | 9/2004 | Basson et al. |
| 6,803,858 | B2 * | 10/2004 | Whitted ........................ 340/903 |
| 6,911,642 | B2 | 6/2005 | Sartori et al. |
| 6,927,677 | B2 * | 8/2005 | Anderson et al. ............ 340/435 |
| 7,474,253 | B2 * | 1/2009 | Natsume ........................ 342/70 |
| 2002/0022927 | A1 * | 2/2002 | Lemelson et al. ............ 701/301 |
| 2002/0198632 | A1 * | 12/2002 | Breed et al. ........................ 701/1 |
| 2005/0073438 | A1 * | 4/2005 | Rodgers et al. ............... 340/944 |
| 2005/0137786 | A1 * | 6/2005 | Breed et al. ................... 701/200 |
| 2005/0192730 | A1 * | 9/2005 | Churchill et al. ............... 701/45 |
| 2006/0055525 | A1 * | 3/2006 | Kubota et al. ................. 340/461 |
| 2006/0284760 | A1 * | 12/2006 | Natsume ........................ 342/70 |
| 2007/0188348 | A1 * | 8/2007 | Bauer et al. ................... 340/905 |
| 2007/0241932 | A1 * | 10/2007 | Otero et al. ................... 340/901 |
| 2008/0084283 | A1 * | 4/2008 | Kalik ............................ 340/435 |
| 2008/0291052 | A1 * | 11/2008 | Burns ............................ 340/903 |

* cited by examiner

*Primary Examiner* — Khoi Tran
*Assistant Examiner* — Jonathan L Sample
(74) *Attorney, Agent, or Firm* — Cantor Colburn LLP; Ronald Kaschak

(57) ABSTRACT

A method for detecting and alerting a user of objects in their blind spots, includes: tracking movement and relative position of a user to one or more objects; determining a blind spot of the user; determining when at least one of the one or more objects occupies the blind spot of the user; and transmitting a signal to a user mobile device to perform an alarm operation when at least one of the one or more objects occupies the blind spot of the user.

7 Claims, 5 Drawing Sheets

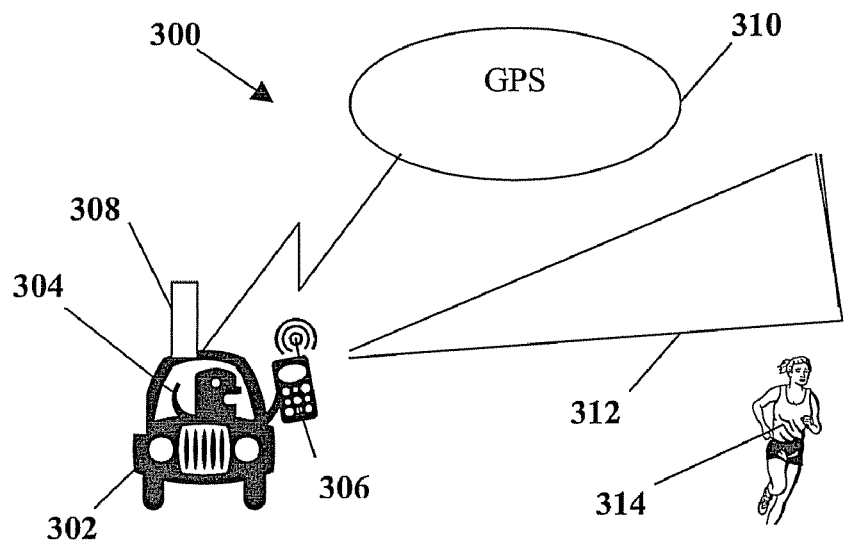
FIG. 3
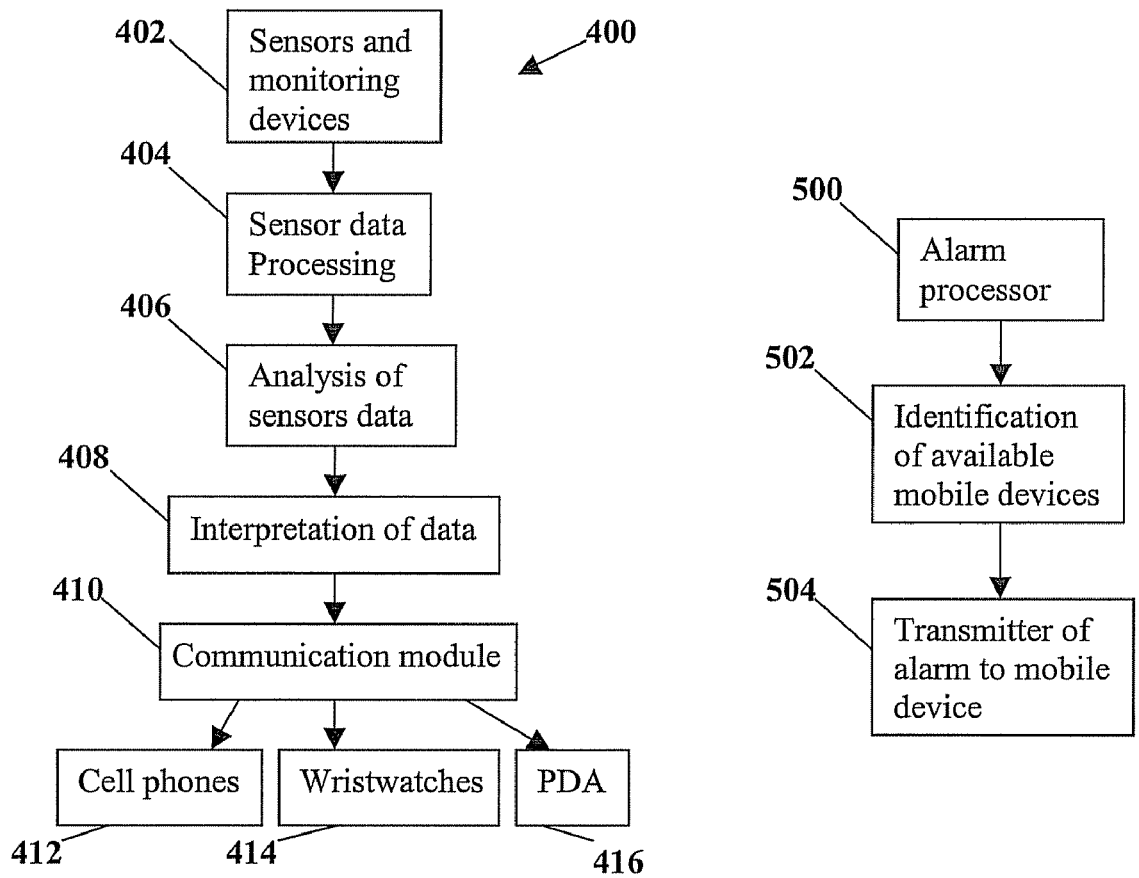
FIG. 4
FIG. 5

METHOD AND SYSTEM FOR BLIND SPOT IDENTIFICATION AND WARNING UTILIZING PORTABLE AND WEARABLE DEVICES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to vehicle blind spot identification, and more particularly to a method and system for alerting a driver or pedestrian to the presence of vehicles, pedestrians, or objects in their blind spot.

2. Description of the Related Art

A major contributor to vehicle accidents is blind spots in the rear side perspective views of a driver. The driver blind spots occur when a second vehicle is traveling slightly behind and along side the driver's vehicle in an accompanying lane. Blind spot accidents occur when a driver switches lanes and is unaware that a second vehicle is occupying the intended new lane. As a result a collision between the two vehicles occurs. Driver blind spots exist despite the fact that vehicles are equipped with a series of view mirrors to assist the driver. The series of mirrors are generally configured as a rear view mirror that is internally mounted above the front windshield in the center of the vehicle, and one or two external side mirrors that are mounted on the front side portions of the vehicle. The series of mirrors are designed to allow the driver to have a rear view without having to turn their head to the rear.

External side mirrors and the rear view mirror reduce the driver blind spots. However, it is nearly impossible to eliminate all blind spots with mirror adjustment. The exact area of the driver blind spot varies depending on the type of vehicle and height of the driver. Accordingly, rear blind spots for midsize sedans range between 12-17 feet behind the vehicle, mini vans range from 13-23 feet, and midsize trucks between 29-51 feet. Each of the ranges accounts for various heights of the driver. Tractor-trailer drivers encounter a much larger visual impairment. The blind spots are located on either side, the rear, and directly in front of the tractor-trailer. In the US, over 200,000 accidents between cars and trucks occur each year. Eighty percent of car drivers involved in tractor-trailer accidents don't survive.

Current efforts to solve the driver blind spot problem have been directed towards developing a blind spot monitoring system that will alert the driver of vehicles that are present in their blind spots. Blind spot monitors include, a camera mounted on the back bumper of a car that shows the driver video feeds of objects behind the car when it is in reverse. Another option called VORAD (Vehicle On-board Radar) transmits and receives microwave signals, alerting a driver to obstructions. The VORAD system can penetrate through environmental conditions such as darkness, fog, dust, and smoke. The VORAD system is currently used on busses to detect vehicles along the side and in front of the bus. A lane-changing alarm is another product available to consumers. The lane changing alarm is designed using a passive infrared sensor that detects the heat of a moving tire and a light emitting diode (LED) that flashes when vehicles, pedestrians, or other objects are in the side blind spot. A product designed for commercial vehicles employs ultrasonic sensors mounted on the outside of the vehicle to detect obstructions at slow speeds.

SUMMARY OF THE INVENTION

Embodiments of the present invention include a method and system for detecting and alerting a user of objects in their blind spots, includes: tracking movement and relative position of a user to one or more objects; determining a blind spot of the user; determining when at least one of the one or more objects occupies the blind spot of the user; and transmitting a signal to a user mobile device to perform an alarm operation when at least one of the one or more objects occupies the blind spot of the user.

A system for detecting and warning users of blind spot hazards, the system includes: one or more mobile devices; one or more monitoring and tracking devices that are configured with software; wherein the tracking devices determine the relative position of a user to one or more objects; wherein the tracking devices transmit the relative position of the user to the one or more objects to the monitoring devices; wherein the monitoring devices calculate blind spot hazards based on the tracking devices transmissions; and wherein monitoring devices issue an alarm command signal to the one or more mobile devices in response to a determined blind spot hazard.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a method and system for utilizing wearable devices and portable communication devices to enhance driver and pedestrian awareness of a vehicle or object entering into a driver's or pedestrian's blind spot.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates a system for warning a driver when a pedestrian enters a driver's bind spot according to embodiments of the invention.

FIG. 4 is an operational block diagram of a system to implement embodiments of the invention.

FIG. 5 is a detailed operational block diagram of a communications module of FIG. 4 according to an embodiment of the invention.

Figure 1:
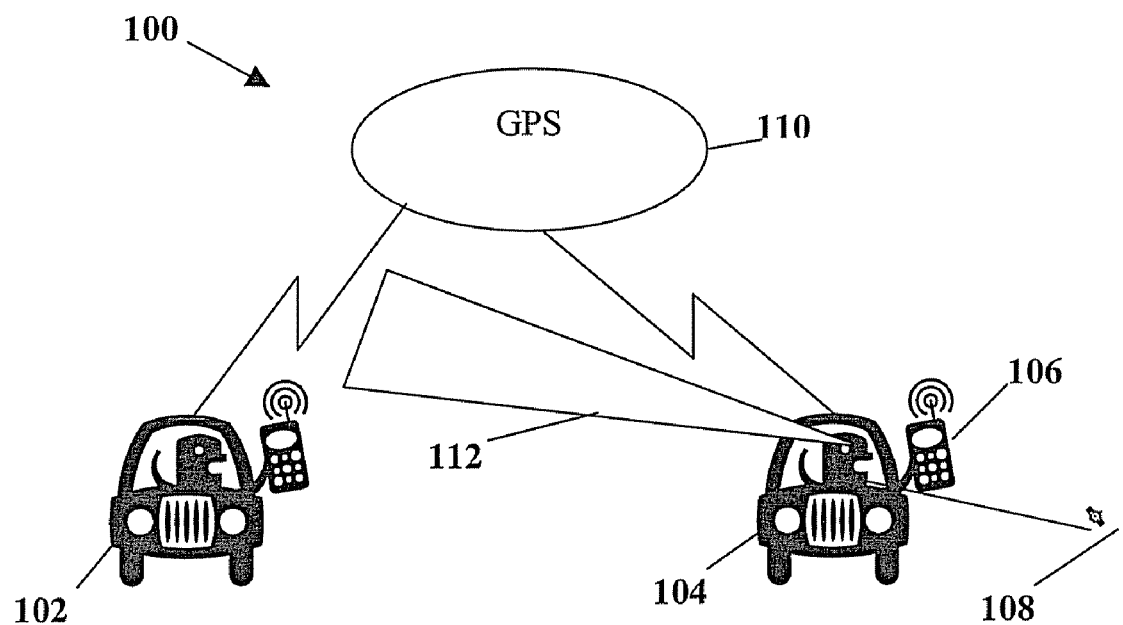
FIG. 1 illustrates a system for warning a driver of a vehicle in their blind spot according to embodiments of the invention.

The detailed description explains the preferred embodiments of the invention, together with advantages and features, by way of example with reference to the drawings.

DETAILED DESCRIPTION

Embodiments of the invention provide a method and system for providing a driver of a vehicle a warning of the presence of another vehicle, pedestrian or obstacle in the driver's blind spot. The blind spot warning system utilizes a series of sensors attached to the driver's vehicle, and global positioning system (GPS) satellites to detect the presence of a vehicle in the driver's blind spot. The series of sensors are wirelessly connected to a mobile alarm device. In embodiments of the invention, the mobile alarm device is incorporated into wearable devices such as a wristwatch, or into a cell phone. In embodiments of the invention, the mobile devices may be equipped with bluetooth transceivers to establish a wireless link with the blind spot detectors. The alarm may be audible, vibratory, or both. In embodiments of the invention, the intensity of the alarm signal is variable to reflect the relative position of the other vehicle within the driver's blind spot. For example, the intensity of the alarm signal increases in intensity as the other vehicle approaches into the blind spot, and decreases in intensity as the other vehicle exits the blind spot. Embodiments of the invention may also be implemented on a bicycle, to warn a rider of vehicles or other bicyclists in the rider's blind spot. In another embodiment of the invention a blind spot warning device for pedestrians is integrated into mobile or wearable devices such as wristwatches, cell phones, walking aids, and canes to warn of approaching vehicles.

In further embodiments of the invention, the blind spot warning system can alert a driver, cyclists or pedestrian when they are approaching and entering into a potential blind spot of a vehicle. In an exemplary embodiment, a vehicle A enters into the blind spot of a vehicle B. The blind spot for the driver B of vehicle B may be determined within various degrees of precision. In a first approach, it is assumed that the driver B in vehicle B has a standard position and environment (e.g., looks straight ahead and has some typical location (height) for their head and some typical orientation for a mirror in the car). The blind spots for the driver B of vehicle B may then be pre-calculated by mathematical models in advance and would be the same for each type of vehicle model and make. In a second approach, a monitoring system in vehicle A can observe the environment of driver B, and an intelligent system in vehicle A can dynamically compute blind spots for diver B residing in the vehicle B using the information that was received by the monitoring system in the vehicle A. A system that may monitor inside of a car is described in U.S. Pat. No. 6,792,339 entitled "Artificial Passenger with Condition Sensors" and is hereby incorporated by reference herein. In a third approach, a monitoring system in the vehicle B transmits data to other nearby vehicles, including the vehicle A. The transmitted data is utilized by the intelligent system in vehicle A to calculate the blind spots for driver B. This approach assumes the existence of a communication system between workload managers in the vehicles. The workload manager collects information from on board vehicle sensors and external sensors with regards to vehicle location, speed, and direction of travel. Workload managers are described in patent application publication U.S. 20050192730 entitled "Driver Safety Manager" and is hereby incorporated by reference herein.

FIG. 1 illustrates a situation 100 according to an embodiment of the invention, where a driver in vehicle 104 has a vision field 112, and a GPS 110 detects when a vehicle 102 travels into a blind spot (i.e., out of the driver's vision field 112), and an alarm signal is initiated to either the driver's cell phone 106 or wristwatch 108. In situation 100, both vehicle 102 and vehicle 104 are equipped with GPS chipsets to relay their relative positions. The alarm signal persists until vehicle 102 is no longer in the driver's blind spot.

Figure 2:
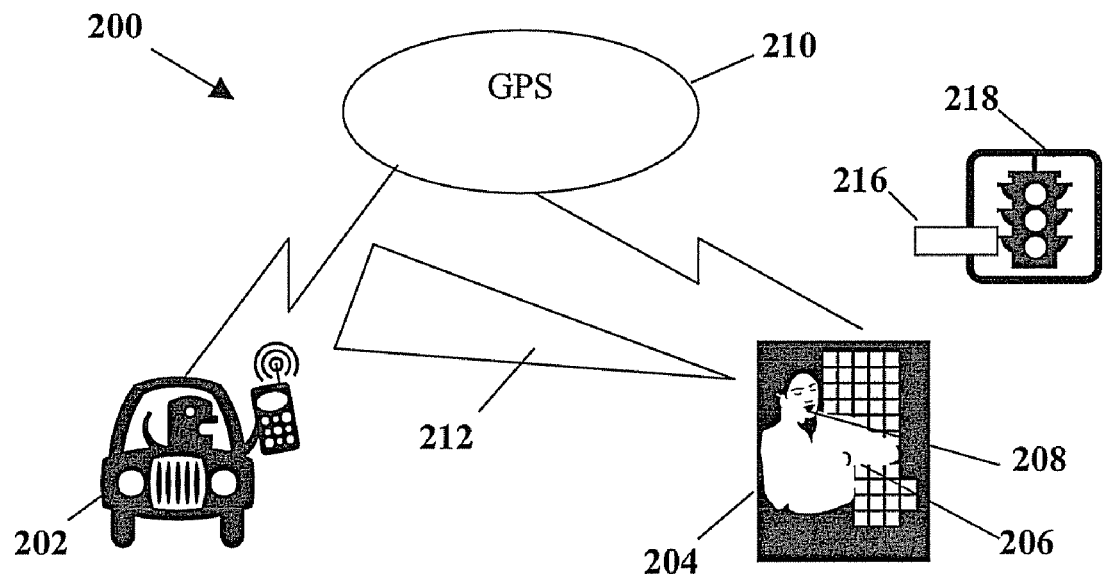
FIG. 2 illustrates a system for warning a pedestrian when a vehicle is in a blind spot of a pedestrian according to embodiments of the invention.

FIG. 2 illustrates a situation 200 according to an embodiment of the invention, where a vehicle 202 is in the blind spot of a pedestrian 204 (i.e., out of the pedestrian's 204 vision field 212). The determination of the vehicle 202 being in the pedestrian's blind spot is made with cameras 216 mounted in the intersection, and in conjunction with the GPS 210. In situation 200, the vehicle 202 and pedestrian 204 are equipped with GPS chipsets to relay their relative positions. In the example embodiment, the cameras 216 are mounted on the traffic control devices 218. When the vehicle 202 is determined to be in the pedestrian's 204 blind spot, an alarm signal is sent to the pedestrian's 204 cell phone 208, or wristwatch 208. In the case of a handicapped individual, the signal could be vibratory for the hearing impaired, or auditory for the blind, and walking aids or wheelchairs may be equipped with the blind spot alarm.

FIG. 3 illustrates a situation 300 according to an embodiment of the invention, where a driver of a vehicle 302 has a vision field 312, and a pedestrian 314 has entered into the driver's blind spot. Cameras 308 mounted to the vehicle in conjunction with the GPS 310 determine the driver's blind spot, and track potential hazards to avoid, such as the pedestrian 314 that are within the blind spot. When a hazard or pedestrian 314 enters the driver's blind spot, an alarm is sent to the driver's cell phone 306, wristwatch 304, or another portable communication or computing device.

FIG. 4 is an operational block diagram of a system 400 to implement embodiments of the invention. A series of sensors and monitoring devices made up of cameras, motion detectors, proximity measurement devices, infrared detectors, GPS, and other location devices (block 402) provide situational and location data for processing (block 404) and analysis (block 406). During analysis (block 406) the data from the various sensors and monitoring devices are correlated, for example positional data from the GPS is correlated with and related to the information obtained from the cameras to determine when a potential hazard situation is developing in a driver's blind spot. The data is interpreted (block 408), and if an alarm situation develops within a determined blind spot, the information is sent to the communications module (block 410). The communications module transmits instructions to mobile and wearable devices (i.e., cell phones (block 412), wristwatches (block 414), personnel digital assistants (PDA) (block 416), etc.).

FIG. 5 is a detailed operational block diagram of the communications module (block 410) of FIG. 4 according to an embodiment of the invention. The alarm processor (block 500) receives the alarm condition and initiates the identification of the available mobiles devices (block 502) that may be utilized to warm the target recipients of a blind spot hazard condition. Instructions to initiate a blind spot alarm signal are transmitted to the identified mobile devices (block 504)

Figure 6:
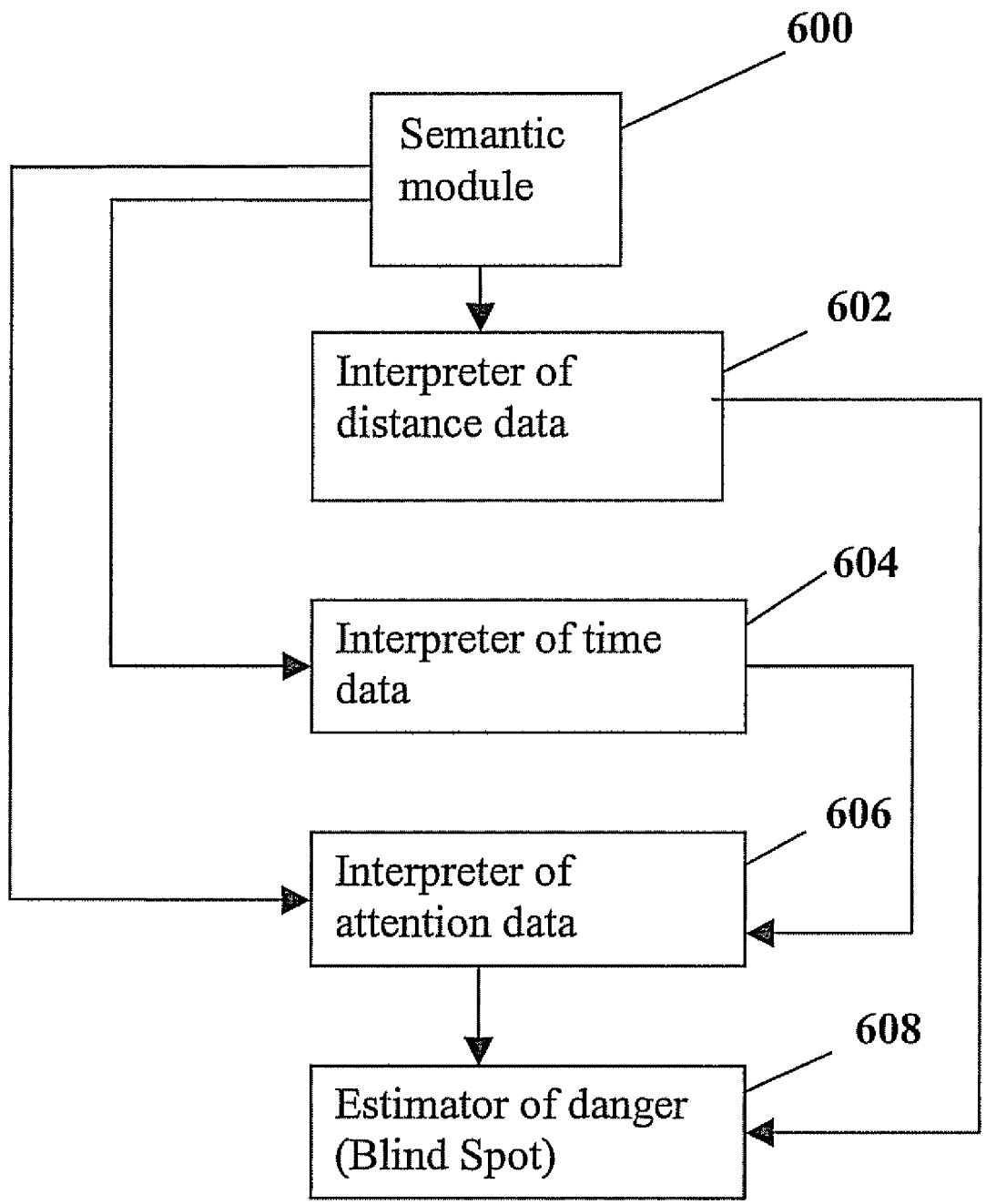
FIG. 6 is a detailed operational diagram of a data interpreter (block 408) of FIG. 4 according to an embodiment of the invention.

FIG. 6 is a detailed operational diagram of the data interpreter (block 408) of FIG. 4 according to an embodiment of the invention. The semantic module (block 600) processes the correlated data semantically, hence the name. Semantics refers to the aspects of meaning that are expressed in a language, code, or other form of representation of information. The semantic module supplies the interpreter of distance data (block 602), interpreter of time data (block 604), and interpreter of attention data (block 606) with data inputs. The interpreter of distance data (block 602) determines how far a vehicle is from another vehicle or a pedestrian. The interpreter of time data (block 604) determines how soon a potential hazard may result in an accident, and for example provides information on how many seconds are left to send an alarm before a potential accident occurs. The interpreter of attention data (block 606) identifies if a driver or pedestrian is paying attention. The interpreter of danger (block 608) combines the outputs of the other interpreters (blocks 602, 604, 606) to determine the imminence of danger, and whether to request an alarm signal.

Figure 7:
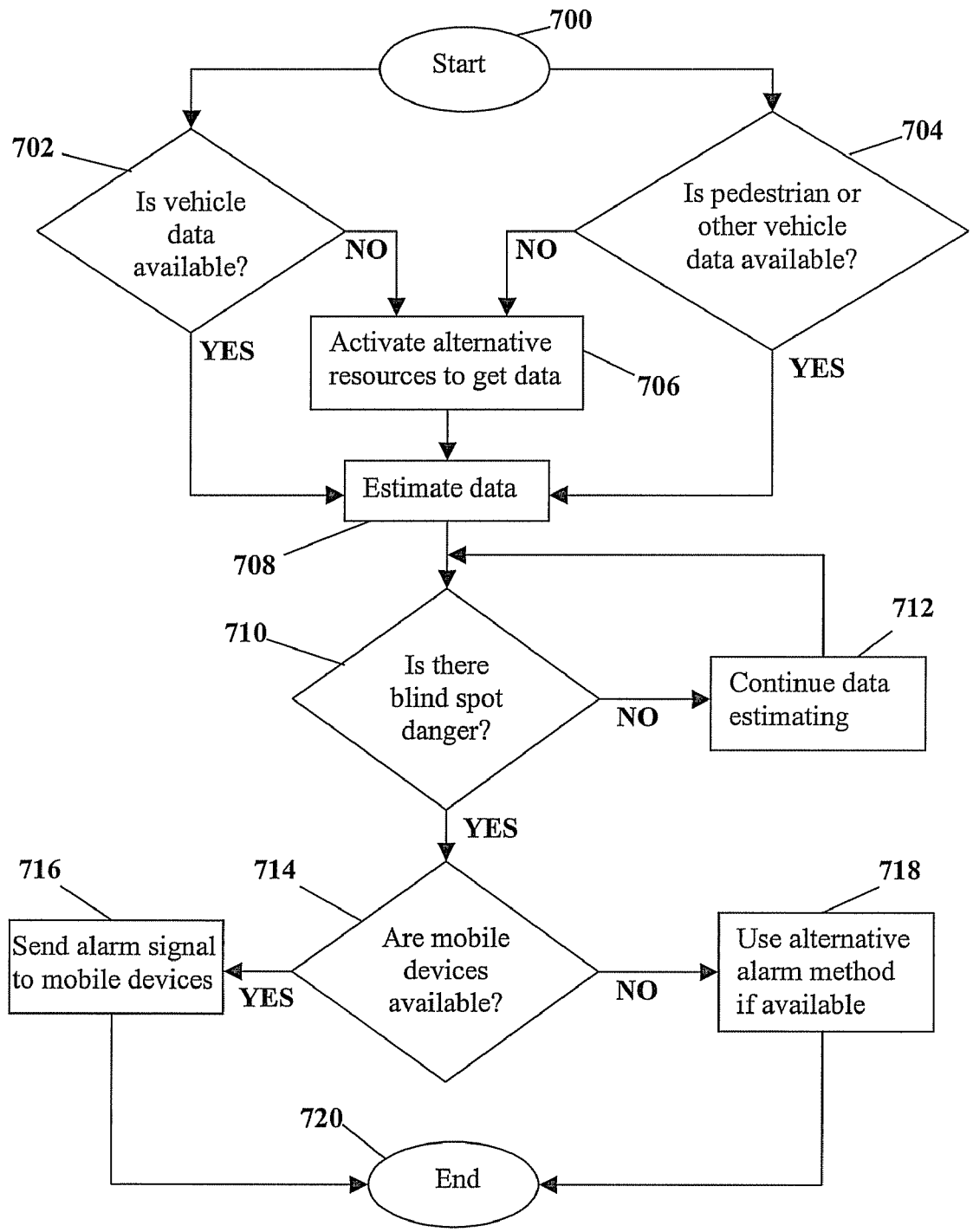
FIG. 7 is a flow diagram illustrating a process for utilizing mobile devices to enhance driver and pedestrian awareness of a vehicle or object entering into a driver or pedestrian's blind spot according to embodiments of the invention.

FIG. 7 is a flow diagram illustrating a process for utilizing mobile devices to enhance driver and pedestrian awareness of a vehicle or object entering into a driver or pedestrian's blind spot according to embodiments of the invention. The process starts (block 700) with a determination of available data from a vehicle (block 702), a second vehicle or pedestrian (block 704), or from alternative sources (block 706). The available data is employed to form estimations (block 708) of potential blind spots. If no blind spot danger is determined (block 710 is NO), the estimation process continues (block 712) until a potential blind spot danger is determined (block 710 is YES). When a potential blind spot is determined (block 710 is YES) an alarm signal is sent to mobile devices (block 716) if there are mobile devices available (block 714 is YES), or to alternative alarm devices if available (block 718), and the process ends (block 720).

Figure 8:
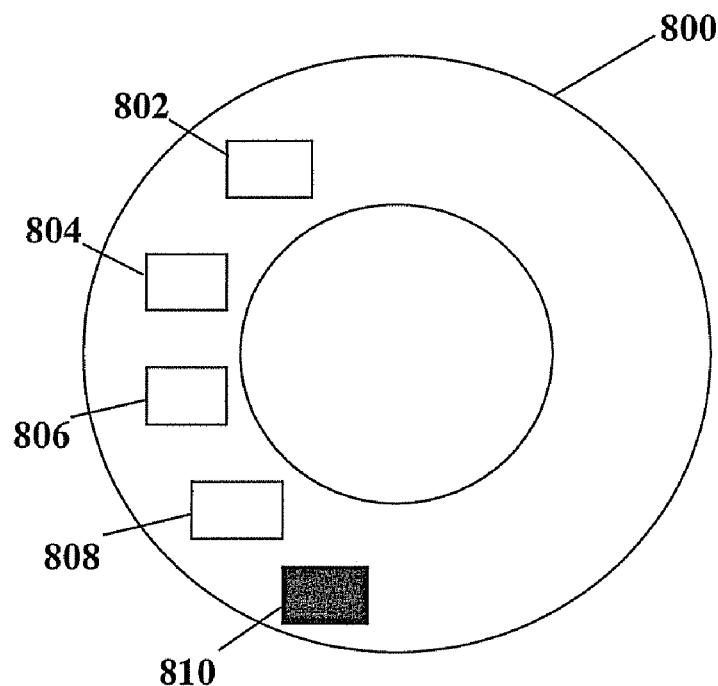
FIG. 8 illustrates a mobile device with a series of combined sensors and vibratory pad indicators to transmit tactile alarm messages according to embodiments of the invention.

FIG. 8 illustrates a mobile device 800 with a series of combined sensors and vibratory pad indicators that are represented by rectangles 802, 804, 806, and 808. The combined sensors and vibratory pad indicators (802, 804, 806, 808) are positioned on the case of the mobile device 800 to correspond with the tips of the user's fingers (excluding the thumb) when they hold the device. The combined sensors and vibratory pad indicators (802, 804, 806, 808) detect the presence of a user finger, and provide a tactile signal to the finger. A central processing unit (CPU) 810 coordinates the combined sensors and vibratory pad indicators (802, 804, 806, 808), and provides sequences of tactile codes to the combined sensors and vibratory pad indicators (802, 804, 806, 808).

Figure 9:
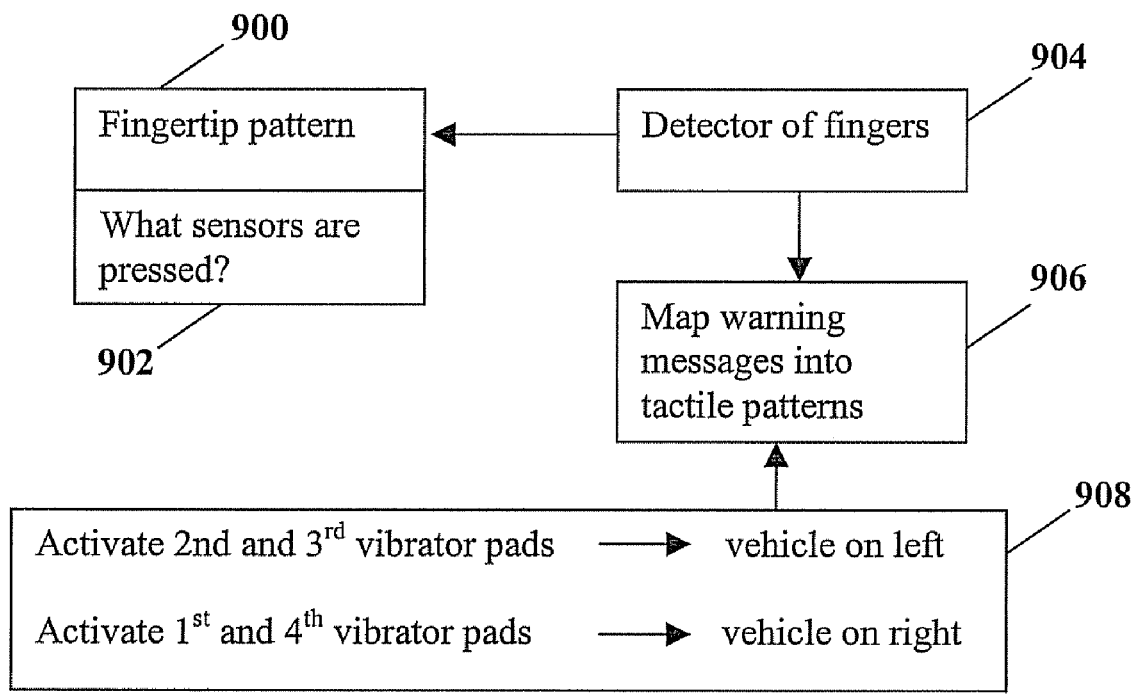
FIG. 9 is an operational block diagram of the series of combined sensors and vibratory pad indicators of FIG. 8 according to embodiments of the invention.

FIG. 9 functional block diagram illustrating the operation of the CPU 810 of FIG. 8. A fingertip pattern (block 900) is defined on the mobile device, and a detector (block 904) determines which sensors (802, 804, 806, 808) are depressed or in contact with a user's finger (block 902). The CPU 810 maps warning messages into tactile patterns or sequences (block 906) based on predefined alarms (block 908). For example, if vibrator pads 804 ($2^{nd}$ pads) and 806 ($3^{rd}$ pads) are activated, a vehicle on the left may be in a blind spot. Whereas, if vibrator pads 802 ($1^{st}$ pads) and 808 ($4^{th}$ pads) are activated, a vehicle on the right may be in a blind spot.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for detecting and alerting a user in a first vehicle of moving into a blind spot following a second vehicle, the method comprising:
   tracking movement and relative position of the first vehicle to the second preceding vehicle;
   determining, with a monitoring device in the first vehicle, a blind spot of the second vehicle;
   determining when the first vehicle occupies the blind spot of the second vehicle; and
   transmitting a signal to a user mobile device of the user in the first vehicle to perform an alarm operation when the first vehicle enters into the blind spot of second vehicle;
   wherein a monitoring system in the second vehicle transmits data to the first vehicle; and
   wherein the transmitted data is utilized by the monitoring device in the first vehicle to determine the blind spot of the second vehicle.

2. The method of claim 1, wherein the tracking and relative position of the first vehicle to the second vehicle is conducted with at least one of the following: a global position satellite (GPS) system, and cameras.

3. The method of claim 1, wherein the determining of the one or more objects blind spots is pre-calculated with mathematical models.

4. The method of claim 1, wherein the mobile devices comprise at least one of the following: cell phones, wristwatches, portable computing devices, canes, and walking aids.

5. The method of claim 1, wherein the alarm operation comprises one or more audible sounds.

6. The method of claim 1, wherein the alarm operation comprises one or more tactile vibratory signals.

7. The method of claim 6, wherein the sequence and placement of the vibratory signals on the mobile device indicate the location of the object with the blind spot.

\* \* \* \* \*